June 6, 1961 L. PETERSEN 2,987,306
METHOD OF COOLING FINELY DIVIDED MATERIALS
Original Filed Aug. 7, 1956 2 Sheets-Sheet 1

INVENTOR
Louis Petersen
by
Pennie Edmonds Morton Barrows Taylor
ATTORNEYS

June 6, 1961

L. PETERSEN 2,987,306

METHOD OF COOLING FINELY DIVIDED MATERIALS

Original Filed Aug. 7, 1956

INVENTOR
Louis Petersen
by
Pennie Edmonds Morton Barrows Taylor
ATTORNEYS

United States Patent Office 2,987,306
Patented June 6, 1961

2,987,306
METHOD OF COOLING FINELY DIVIDED MATERIALS
Louis Petersen, Rye, N.Y., assignor, by mesne assignments, to F. L. Smidth & Co., New York, N.Y., a corporation of Delaware
Original application Aug. 7, 1956, Ser. No. 602,553, now Patent No. 2,913,237, dated Nov. 17, 1959. Divided and this application June 22, 1959, Ser. No. 822,012
5 Claims. (Cl. 263—52)

This invention relates to the cooling of materials which have been heated to a high temperature in roasting, calcining, and like operations and is concerned more particularly with a novel method for effecting cooling of hot material which has been reduced to finely divided condition as a result of being burned. Materials of the kind referred to include alumina, magnesia, kieselguhr, etc., and, since all the advantages of the invention are realized in its use in the cooling of calcined alumina, the adaptation of the method for that use will be illustrated and described in detail for purposes of explanation.

The cooling of hot alumina burned in a rotary kiln has heretofore commonly been carried on in rotary coolers and in coolers, which include cooling chambers mounted in planetary arrangement on the kiln near its lower end. In such coolers, the cooling is effected by the passage of air in contact with the material and the air, which has taken up heat from the material, is then conducted into the kiln to take part in the burning operation. Calcined alumina is of such fineness that it is readily entrained in the stream of cooling air and, as a result, when coolers of the rotary and planetary chamber types are used, the kiln becomes so dusty that it is difficult to control the burning of the fuel to obtain the desired economy. Another disadvantage of such coolers is the high cost of installation and the loss of heat by radiation. Rotary coolers are also expensive to maintain and operate.

The present invention is, accordingly, directed to the provision of a novel method of cooling hot materials of great fineness and overcomes the disadvantages involved in the use of the prior methods above described. In carrying out the new method, the material issuing from the burning chamber or kiln is introduced into an air stream and is subjected to first-stage cooling while being carried in suspension in the air to a separator in which the cooled material is separated from the heated air. The separated material from the first-stage cooling is then subjected to a second-stage cooling by passing it through a cooler of the fluid-bed type.

For a better understanding of the invention, reference may be made to the accompanying drawings, in which.

Figures 1, 2:
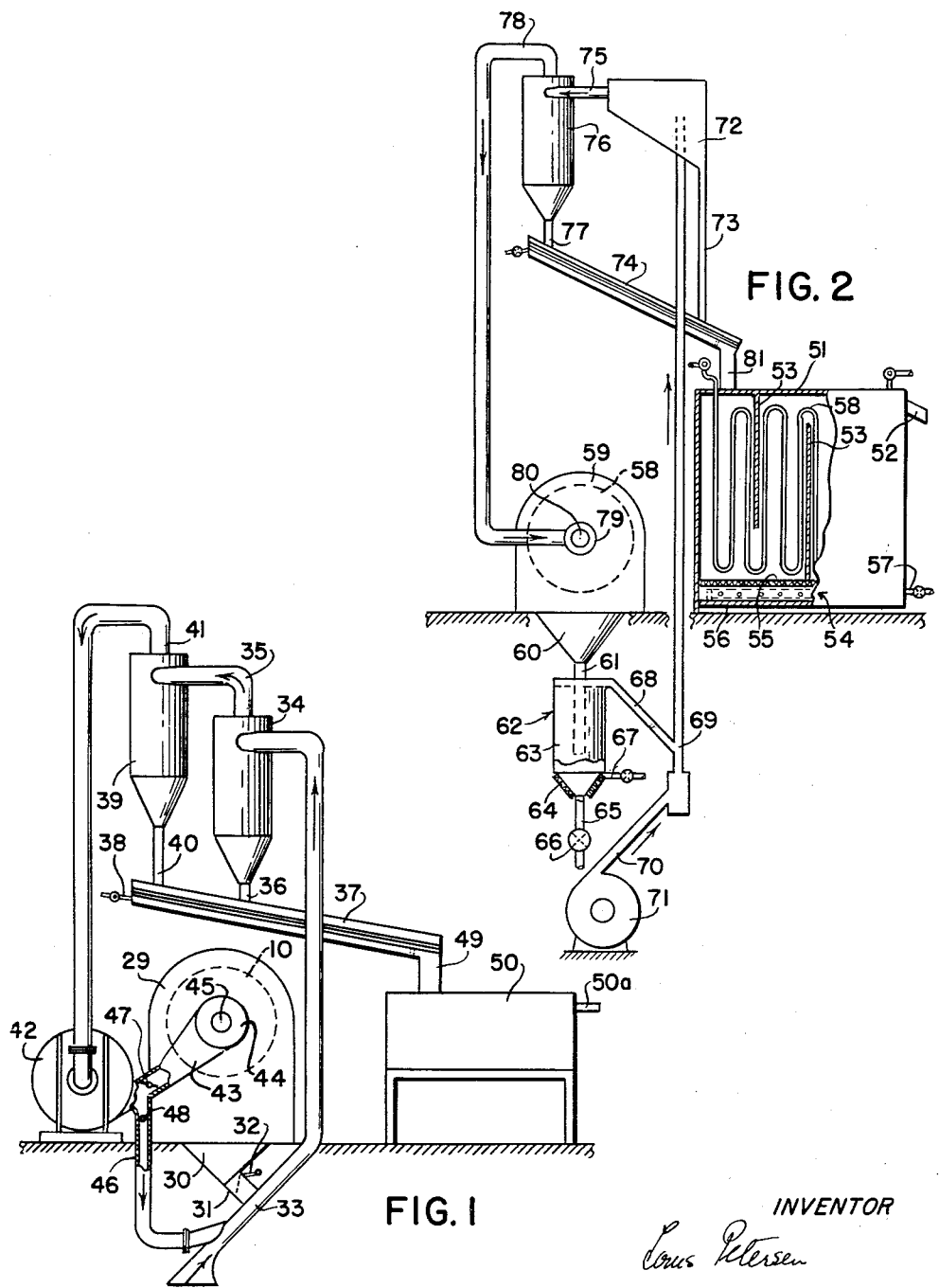
FIG. 1 is a diagrammatic elevational view of apparatus for practicing one form of the method of the invention in connection with a rotary kiln.
FIG. 2 is a diagrammatic elevational view with parts broken away of an installation including apparatus for practicing another form of the method of the invention.

The installation shown in FIG. 1 includes a rotary kiln 10 having a hood 3, into which the lower discharge end of the kiln projects.

The hot burned material discharged from the kiln within the kiln hood 29 enters the hopper 30 at the bottom of the hood and is conducted through a pipe 31 containing a counter-weighted flap valve 32 into a stream of atmospheric air traveling through a riser pipe 33. The pipe leads upwardly to the air inlet of a cyclone separator 34 having an air outlet at its top, from which a pipe 35 leads. The separator has a solids outlet at its bottom, from which the separated solids are lead through a pipe 36 into a conveyor 37 of the pneumatic channel type. Such a conveyor comprises a trough and a cover with a porous diaphragm between and air is supplied to the trough beneath the diaphragm through a pipe 38. The finely divided material issuing from pipe 36 lands on the diaphragm and is aerated by air diffused into the material through the diaphragm. As a result, the material becomes fluent and flows down the diaphragm to its lower end.

The air issuing from separator 34 is to be used for combustion in the kiln and, in order to reduce the amount of dust contained therein, the pipe 35 leads to the air intake of a second cyclone separator 39 or to a dust collector. The solids separated in the cyclone or dust collector are conducted from the solids outlet at the bottom thereof through a pipe 40 into the conveyor 37 and the air issuing from the separator or collector is conducted by a pipe 41 to the intake of a fan 42. The fan outlet is connected by a pipe 43 to a chamber encircling the burner tube 45 extending through the hood 29 and the air is used for secondary combustion in the kiln. However, if desired, part of the air may be drawn from pipe 43 and used to produce the fuel-primary air mixture supplied to the burner pipe. A pipe 46 leads from pipe 43 to the riser pipe 33 below the connection of pipe 31 thereto and pipes 43 and 46 contain dampers 47, 48, by which the relative amounts of air traveling through the two pipes can be controlled. The provision of pipe 46 makes it possible to maintain a fairly constant velocity in the pipe 33 when the kiln is operating at different capacities.

The solids discharged from separator 34 and from the separator or dust collector 39 into the pneumatic conveyor 37 are conducted from the conveyor at its lower end through a pipe 49 into a fluid-bed cooler 50. This cooler may be of the type shown in FIG. 2, which includes a housing 51 having a material inlet through its top adjacent one end and an outlet 52 for material in an end wall near the top at the opposite end. Between the inlet and outlet, the chamber is provided with a plurality of vertical partitions 53, so arranged that the material entering the inlet must travel along a tortuous path before it reaches the outlet. At the bottom, the housing has an aerating chamber 54 with a porous upper wall 55 and a solid lower wall 56. Air is supplied to the chamber through a supply pipe 57 and the air issues through the pervious top wall 55 and enters the material within the housing to aerate and fluidize the material. In its travel from the inlet to the outlet, the fluidized material is cooled by a cooling medium traveling through a bank of tubes 58, which are of sinuous form and lie between the partitions within the housing.

In the practice of the method by the apparatus shown in FIG. 1, the hot burned material issuing from the kiln enters the stream of air traveling through the riser pipe 33 and undergoes a first stage of cooling, while being conveyed in suspension to the separator 34. The solids removed from the air in the separator enter the pneumatic channel conveyor 37 as does additional material removed from the air stream within separator or dust collector 39. The material traveling through the conveyor enters the fluid-bed cooler 50, where the second stage of cooling takes place, and, upon issuance from the cooler 50 through the outlet 50a, the material has been reduced in temperature to the desired final value.

In the installation of FIG. 2, the burned material discharged from the kiln 58 within the hood 59 enters hopper 60, from which it is conducted through pipe 61 into a separating device 62. The device includes a tank 63 having its bottom formed by downwardly convergent aerating chambers 64 and the device has an outlet 65 leading from the lower ends of the chambers and containing a gate valve 66. Air is supplied to the aerating chambers through a supply line 67 and the tank has an overflow pipe 68 leading therefrom at a point above the level of the lower end of pipe 61. The finely divided constituents of the material entering the device 62 are aerated and become fluent therein and the fluidized material issues through pipe 68, while oversize components sink through the aerated material and enter outlet 65, from which they are discharged through the gate valve 66.

The material issuing through pipe 68 is cooled while being conveyed in suspension in an air stream and, for this purpose, the pipe 68 is connected to a riser pipe 69 receiving air at its lower end through a pipe 70 connected to the outlet of a fan 71. The material carried in suspension upward through the riser pipe enters a separating chamber 72 having a bottom outlet for solids, which is connected by a pipe 73 to a pneumatic channel conveyor 74 similar in construction and function to conveyor 37. The chamber 72 has an air outlet connected by a pipe 75 to the inlet of a cyclone separator 76 having a solids outlet at its bottom connected by a pipe 77 to the conveyor 74. The separator 76 has an air outlet at its top connected by a pipe 78 to a chamber 79 encircling the burner pipe 80 entering the kiln through hood 59 and the air issuing from separator 76 and heated by its contact with the hot material may be used within the kiln either as primary or secondary air of combustion. The material leaving the conveyor 74 at its lower end is conducted through a pipe 81 to the inlet of the housing 51 of the fluid-bed cooler previously described, where the material undergoes the second stage of cooling.

Figure 3:
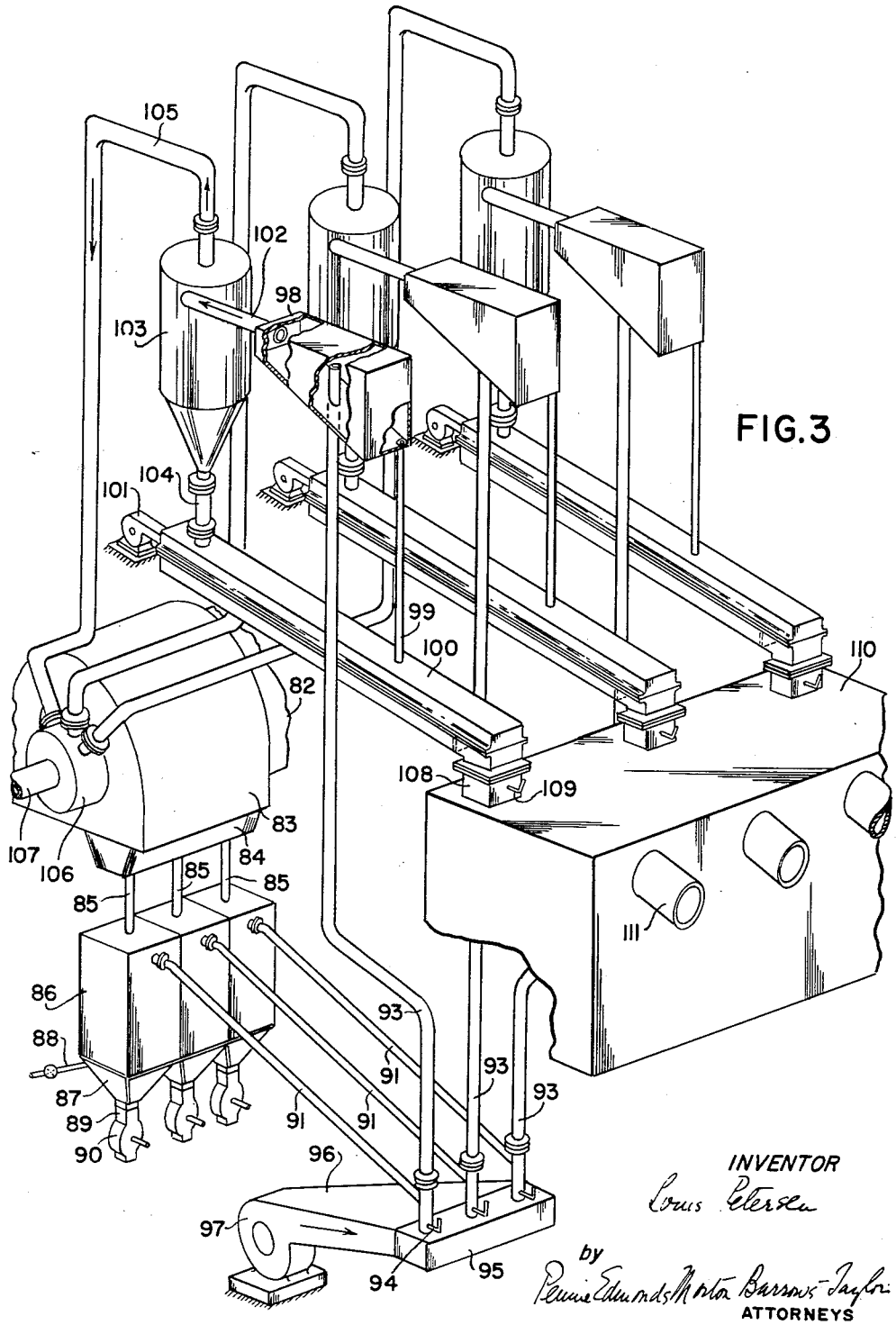
FIG. 3 is a diagrammatic perspective view of another kiln installation in which apparatus for practicing the second form of the method of the invention is employed.

In the installation shown in FIG. 3, the material discharged from the kiln 82 within the hood 83 enters a hopper 84, from which a plurality of pipes 85 conduct the material to respective separating devices 86, which are similar in construction and operation to the separating device 62. Each device 86 has a hopper bottom 87 formed by aerating chambers supplied with air through pipes 88 and an outlet 89 containing a rotary gate valve 90. The outlets for the finely divided material from the devices 86 are connected by respective pipes 91 to riser pipes 93 containing dampers 94 and leading upward from a manifold 95 connected by a pipe 96 to the outlet of a fan 97.

Each riser pipe 93 leads upward to terminate within the separator chamber 98, which is similar to the chamber 72 and has a solids outlet at its lower end connected by a pipe 99 to a conveyor 100 of the pneumatic channel type supplied with air by a fan 101. Each chamber 98 has an outlet for air connected by a pipe 102 to the inlet of a cyclone separator 103 having a solids outlet at its bottom connected to the conveyor 100 by a pipe 104. Each separator 103 has an air outlet at its top connected by a pipe 105 to a chamber 106 surrounding the burner pipe 107 extending through hood 83 into the kiln. The material discharged by conveyor 100 is conducted through pipes 108 containing valves 109 into respective sections of a fluid-bed cooler 110. Each section of cooler 110 may be similar to cooler 50 and has an outlet 111 for the cooled material.

In the practice of the method in the installation of FIG. 3, the burned material discharged from the kiln undergoes a separation operation in one of the separators 86 and oversize components are removed. The finely divided material then travels through one of the pipes 91 to enter the air stream in one of the riser pipes 93. The material conveyed in suspension through the riser pipes is subjected to a first stage of cooling and the solids are removed from the air streams in the separating chambers 98 and the separators or dust collectors 103 and transferred by conveyors to the fluid-bed coooler 111, where the material undergoes the final stage of cooling. The air heated by contact with the material is delivered to the chamber 106 and may pass from the chamber into the kiln for use as secondary air of combustion or, if preferred, part of the air may be utilized as the production of fuel-primary mixture.

In the installation shown in FIG. 3, as in that of FIG. 2, the fan forces the air through the riser pipes instead of drawing the air through the system and this arrangement has the advantage that no dust particles enter the fan. Also, in the installation of FIG. 3, any of the riser pipes 93 may be put out of operation whenever the pipe, the separating device 86, the separating chamber 98, or the cyclone separator 103 associated with that pipe require repairs, and this arrangement offers the further advantage that the number of riser pipes and associated equipment in operation may be varied in accordance with variations in the kiln capacity. In order to prevent flow through a riser pipe 93, it is only necessary to cut off the air supply to the separating device 86 delivering material to the pipe and the flow of material may thus be stopped without the use of mechanical means. A further advantage of the installation shown in FIG. 3 is that the riser pipes are of smaller size than the single pipes used in the other installations described and a better cooling efficiency is obtained by the use of the smaller pipes.

This application is a division of my co-pending application Serial No. 602,553, which was filed August 7, 1956, now U.S. Patent No. 2,913,237 as a continuation-in-part of the then co-pending application Serial No. 477,341, filed December 23, 1954, now patent 2,841,384, issued July 1, 1958.

I claim:

1. A method of cooling hot burned material in finely divided condition discharged from a rotary kiln heated by the combustion in the kiln of a fuel-primary air mixture in the presence of secondary air of combustion, which comprises maintaining a stream of air of an initial temperature not substantially higher than atmospheric, introducing substantially all the hot material from the kiln into the air stream, carrying at least the major portion of the hot material in suspension by and with the stream for a length of time sufficient to effect substantial cooling of the material and heating of the air stream, separating the cooled material from the air stream, and subjecting the separated material to a second cooling operation by advancing the material, while maintaining it in the form of a fluid bed by diffusing an aerating medium into it, and subjecting the material in the bed to indirect heat exchange with a cooling medium.

2. The method of claim 1, which includes aerating the hot material issuing from the kiln under such conditions in a confined space that oversize pieces of material sink and are withdrawn while the remainder of the material overflows from the space, and introducing the overflowing material into the air stream.

3. The method of claim 1, which includes conveying the separated material from the point of separation to the fluid bed by pneumatic conveying in which the material is aerated and flows by gravity.

4. The method of claim 1, which includes subjecting the air, from which the material was separated, to a second separation to remove material therefrom, and combining the solids separated in the two stages and subjecting the combined solids to a second cooling operation.

5. The method of claim 1, in which the hot material issuing from the kiln is divided into a plurality of parts, a plurality of separate air streams of an initial temperature not substantially higher than atmospheric are maintained, substantially all of the several parts of the hot material are introduced into respective air streams at least the major proportion of the hot material introduced into each stream is carried along with the stream in suspension therein for a time sufficiently long to effect substantial cooling of the material and heating of the stream, the material suspended in each stream is separated therefrom, and the separated quantities of material are further cooled by being advanced in the form of separate fluid beds being aerated by a gaseous medium diffused into the material, the material in the beds being subjected to indirect heat exchange with a cooling medium.

References Cited in the file of this patent
UNITED STATES PATENTS

| | | |
|---|---|---|
| 2,529,366 | Bauer | Nov. 7, 1950 |
| 2,548,642 | White | Apr. 10, 1951 |
| 2,587,378 | Petersen | Feb. 26, 1952 |
| 2,757,921 | Petersen | Aug. 7, 1956 |
| 2,761,668 | Sylvest | Sept. 4, 1956 |
| 2,904,323 | Cova et al. | Sept. 15, 1959 |